United States Patent [19]
de Greeve

[11] Patent Number: 5,815,965
[45] Date of Patent: Oct. 6, 1998

[54] PORTABLE DEALER LICENSE PLATE AND ADVERTISING STRIP HOLDER

[76] Inventor: Bernard de Greeve, 24 Hawkford Pl. NW., Calgary, Alberta, Canada, T3G 3G9

[21] Appl. No.: 617,389

[22] Filed: Mar. 18, 1996

[51] Int. Cl.[6] ....................................................... G09F 7/00
[52] U.S. Cl. ................................ 40/209; 40/210; 40/617; 40/654.01
[58] Field of Search .............................. 40/200, 209, 210, 40/591, 611, 644, 643, 654.01, 661, 766, 771, 776, 124.2, 617

[56] References Cited

U.S. PATENT DOCUMENTS

| | | | |
|---|---|---|---|
| 1,725,194 | 8/1929 | Irving | 40/210 |
| 3,309,805 | 3/1967 | Thomas | 40/771 X |
| 3,430,376 | 3/1969 | Drybread, Sr. et al. | 40/209 |
| 3,461,584 | 8/1969 | Wilson | 40/591 |
| 3,940,778 | 2/1976 | Craig et al. | 40/771 X |
| 4,095,360 | 6/1978 | Dinan et al. | 40/661 X |
| 5,092,066 | 3/1992 | Brewster | 40/617 |
| 5,323,552 | 6/1994 | Fritz | 40/771 X |

*Primary Examiner*—Brian K. Green
*Attorney, Agent, or Firm*—David S. Thompson

[57] ABSTRACT

Automobile dealers and auto body shops, frequently move dealer license plates between vehicles in their inventory or between vehicles temporarily in their care. They like to advertise their company name on these vehicles while they are being driven. A portable license plate holder for supporting an advertising strip and a license plate in a vertical relationship, includes: a back side portion having a width sufficiently wider than the license plate to permit fastening thereto adjacent to both opposite lateral sides of the license plate, and a height sufficiently higher than the combined height of the advertising strip and the license plate to permit fastening thereto both above, below, and horizontally between the advertising strip and license plate; a front side portion mated to cover the back side portion and fastened thereto along a top, bottom, and side portion thereof, as well as horizontally along a central portion thereof whereby two horizontal pockets are formed for the lateral insertion of the license plate and the advertising strip; a strip having opposite ends, each end carrying an opposite lateral side portion of the back side portion; and, a fastener to releasably close the back side portion to the front side portion along the unfastened side portions thereof. The license is encased between the front and back side portions, which are preferably made of vinyl. The license plate holder is made of material that will not damage the finish on the vehicles.

1 Claim, 1 Drawing Sheet

PORTABLE DEALER LICENSE PLATE AND ADVERTISING STRIP HOLDER

FIELD OF THE INVENTION

This invention relates to license plate holders and more particularly to such license plate holders which facilitate easy transfer of the license plate between different vehicles.

BACKGROUND OF THE INVENTION

Dealer license plates are used by businesses, such as new and used automobile dealers or auto body shops, on vehicles in their inventory and vehicles which they are temporarily responsible for that are not equipped with their own registered plates. Portable dealer license plate holders are a fast and convenient way of temporarily installing license plates on these vehicles so that they may be driven. For example, new and used auto dealers purchase license plates and insurance on a per unit basis. These license plates may be transferred between the vehicles in their inventory as required when such vehicles are being test driven or otherwise moved. While being driven, portable dealer license plates must be clearly visible.

OBJECTS AND STATEMENT OF THE INVENTION

It is an object of this invention to disclose a dealer license plate holder which will incorporate a protected advertising strip on a dealer license plate holder which may be transferred from vehicle to vehicle with the license plate. It is an object of this invention to disclose an economic, convenient, and effective means of displaying advertising on these portable dealer license plate holders when and only when they are being driven. It is a final object of this invention to disclose a portable dealer license plate holder which will allow easy installation and removal of the dealer license plate holder.

SUMMARY OF THE INVENTION

One aspect of this invention provides for a portable license plate holder for displaying an advertising strip and license plate in vertical alignment comprising: a back side portion having a width sufficiently wider than the license plate to permit fastening thereto adjacent to both opposite lateral sides of the license plate, and a height sufficiently higher than the combined height of the advertising strip and the license plate to permit fastening thereto both above, below, and horizontally between the advertising strip and license plate; a front side portion mated to cover the back side portion and fastened thereto along a top, bottom, and side portion thereof, as well as horizontally along a central portion thereof whereby two horizontal pockets are formed for the lateral insertion of the license plate and the advertising strip; a strip having opposite ends, each end carrying an opposite lateral side portion of the back side portion; and, means to releasably close the back side portion to the front side portion along the unfastened side portions thereof.

A preferred aspect of this invention provides for a license plate holder as above wherein the back side portion and the strap comprise colored vinyl, and the front side portion comprises clear vinyl, and said vinyl is stitched together.

Various other objects, advantages and features of novelty which characterize this invention, are pointed out with particularity in the claims annexed to, and forming part of this disclosure. For a better understanding of the invention, its operating advantages, and the specific objects attained by its users, reference should be made to the accompanying drawings and description, in which preferred embodiments of the invention are illustrated.

BRIEF DESCRIPTION OF THE DRAWINGS

The invention will be better understood and objects other than those set forth will become apparent to those skilled in the art when consideration is given to the following detailed description thereof. Such description make reference to the annexed drawings wherein.

Figure 1:
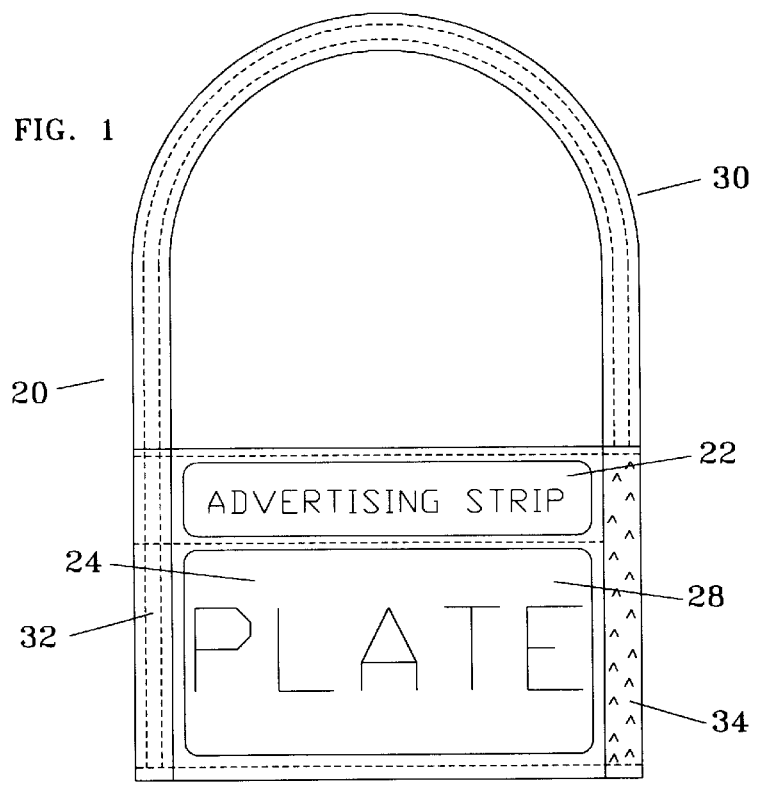
FIG. 1 is a front view of a Dealer License Plate Holder having an advertising strip above the license plate.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

PREFFERED EMBODIMENT

Figure 2:
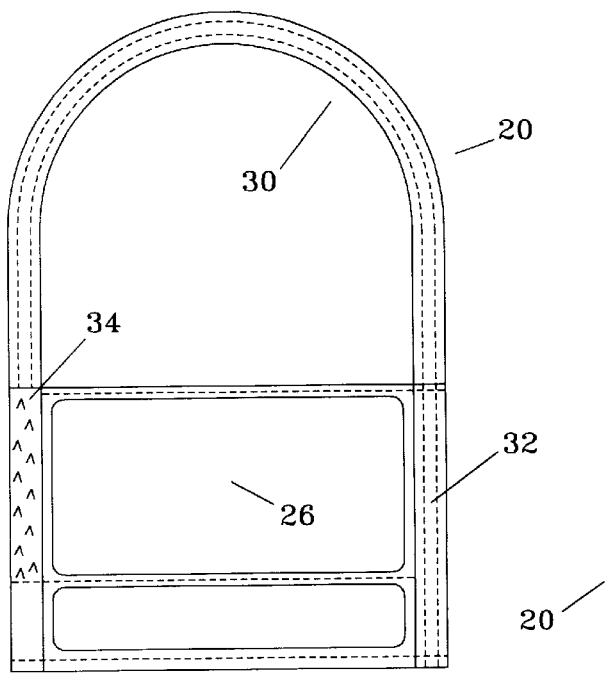
FIG. 2 is a rear view of a Dealer License Plate Holder having an advertising strip below the license plate.

Turning now to the drawings and more particularly to FIG. 1 we have a front view of a Dealer License Plate Holder 20 having an advertising strip 22 above the license plate 28. FIG. 2 is a rear view of a Dealer License Plate Holder 20, similar to that shown in FIG. 1, but for the placement of the advertising strip 22 which is placed below the license plate 24. The portable dealer license plate holder 20, for displaying an advertising strip 22 and license plate 28 in vertical alignment, comprises: 1) a back side portion 26 having a width sufficiently wider than the license plate to permit fastening thereto adjacent to both opposite lateral sides of the license plate 28, and a height sufficiently higher than the combined height of the advertising strip and the license plate to permit fastening thereto both above, below, and horizontally between the advertising strip and license plate 24; 2) a front side portion mated to cover the back side portion 26 and fastened thereto along a top, bottom, and side portion thereof, as well as horizontally along a central portion thereof, whereby two horizontal pockets are formed for the lateral insertion of the license plate 24 and the advertising strip 22; 3) a strap 30 having opposite ends, each end carrying an opposite lateral side portion of the back side portion; and, 4) means to releasably close the back side portion to the front side portion along the unfastened side portions thereof, said means preferably being a VELCRO TM strip 34.

Figure 3:
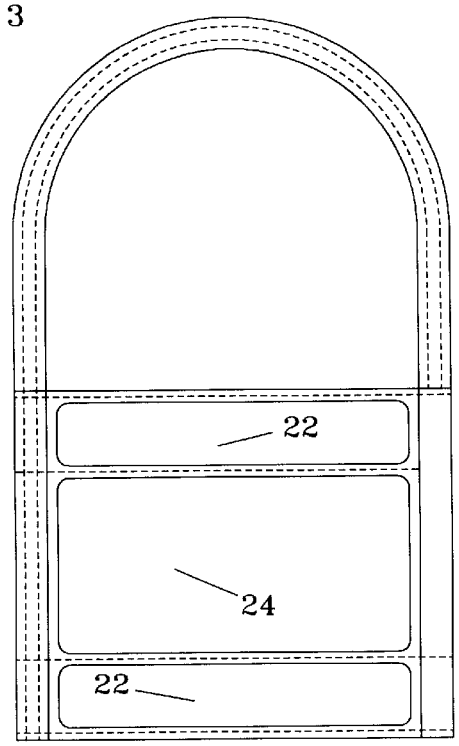
FIG. 3 is a front view of a Dealer License Plate Holder having an advertising strip both above and below the license plate.

Most preferably the back side portion 26, and the strap 30 comprise colored vinyl, and the front side portion comprises clear vinyl. Most preferably stitches are used to fasten the back side portion 26 to the front side portion 24 and the opposite ends of the strap 30. A front frame side portion 32 also made of colored vinyl may be stitched on the front side portion around the license plate and the advertising strip to improve the appearance of the License Plate Holder 20. The advertising strip 22 may be positioned above the license plate 28 as is shown in FIG. 1, below the license plate as is shown in FIG. 2, or both above and below the license plate as is shown in FIG. 3. In this later case, where an advertising strip is positioned both above and below the license plate 24, the fabrication is similar, but for the fact that the back side portion and the mating front portion have a height sufficiently higher than the combined height of the two advertising strips 22 and the license plate 24 to permit fastening there together both above, below, and horizontally between the advertising strips and license plate.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A portable license plate holder for displaying an upper advertising strip, a license plate and a lower advertising strip in vertical alignment, wherein the portable license plate holder comprises:

(A) a back side portion, made of flexible sheet material;

(B) a front side portion made of a transparent flexible sheet material fastened to the back side portion along a top, bottom, and side portion, as well as horizontally along a central portion, thereby defining a plurality of pockets, said plurality of pockets having different sizes, including an upper advertising strip pocket, a license plate pocket and a lower advertising strip pocket, the pockets sized for lateral insertion of the upper advertising strip, the license plate and the lower advertising strip;

(C) vertically oriented elongate hook and loop fastening means, carried between the back side portion and the front side portion and adjacent to the upper advertising strip pocket, the license plate pocket and the lower advertising strip pocket, for releasably fastening the back side portion to the front side portion along an unfastened side portion, whereby the upper advertising strip, the license plate and the lower advertising strip may be removably confined within respective pockets; and (D) an elongate strap made of a flexible strip of material, having first and second opposed ends connected by a middle portion, a major part of the middle portion being spaced from the back side portion and the front side portion, the first end sewn between the back side portion and the vertically oriented elongate hook and loop fastening means and a length of the second end of the strap sewn between the front side portion and the back side portion, thereby bounding the license plate pocket and the upper and lower advertising strip pockets on a first side by the fastening means and on a second side by the length of the second end of the strap, and whereby the portable license plate holder may be supported by closing a vehicle's trunk lid on the middle portion of the elongate strap and whereby the middle portion is adapted to support the portable license plate holder from a hook.

* * * * *